UNITED STATES PATENT OFFICE.

ROBERT WERNER, OF LUDWIGSHAFEN-ON-THE-RHINE, GERMANY.

STRONTIUM SALT OF CHOLIC ACID.

1,081,178.  Specification of Letters Patent.  Patented Dec. 9, 1913.

No Drawing.  Application filed November 29, 1912. Serial No. 734,200.

*To all whom it may concern:*

Be it known that I, Dr. ROBERT WERNER, a citizen of the German Empire, residing at Ludwigshafen-on-the-Rhine, in the Kingdom of Bavaria, Germany, have invented certain new and useful Improvements in Strontium Salt of Cholic Acid; and I do hereby declare the following to be a full, clear, and exact description of the invention, such as will enable others skilled in the art to which it appertains to make and use the same.

My invention relates to improvements in a strontium salt of cholic acid.

Careful therapeutic experiments made with persons who suffered from gall-stone have shown, that the strontium salt of the cholic acid which heretofore was unknown has a high anodyne power as against the pain from gall-stone, and that in this respect it is superior to the sodium salts of the bilious acids which heretofore have proved appropriate particularly in the first stages of the disease. This power of the strontium salt of the cholic acid probably results from the fact, that the strontium salt of the cholic acid acts simultaneously in two directions. The cholic acid is the integrant part of the natural salts of the bile which prevent further secretion of cholesterin, while the strontium has the power to reduce inflammations.

The cholic acid may be produced for example from an acid and a base, according to the well known methods of producing salts.

Example: On the waterbath, I dissolve on the one hand 4 kilograms of cholic acid in 40 liters of 50 percentage ethyl alcohol, and on the other hand 1.3 kilograms of strontium hydroxid in 60 liters of water. While the solution of the strontium hydroxid is still hot I filter the same while agitating into the solution of cholic acid which is likewise in a hot state. The strontium hydroxid which at the beginning might be precipitated is by itself dissolved again. Afterward—within the last third of the admixing process—the strontium salt of the cholic acid which sometimes contains a little free cholic acid begins to be precipitated, and it is preferably dissolved again by adding two liters of alcohol. The admixture of the solution of strontium hydroxid is interrupted, when a few drops of a solution of phenolphtalein show, that the neutralization is obtained. After regenerating the alcohol by distillation the product is allowed to cool, whereby a crystal cake of the strontium salt of the cholic acid is obtained.

The strontium salt of the cholic acid has the composition $$(C_{24}H_{39}O_5)_2Sr, 10H_2O,$$

it crystallizes in the form of colorless very fine hair bushes, loses its water when standing over sulfuric acid, and is decomposed by stronger acids into its components.

I claim:

The herein described strontium salt of cholic acid, which answers the formula $$(C_{24}H_{39}O_5)_2Sr, 10H_2O,$$

crystallizes in the form of very fine colorless hair bushes, loses its water when standing over sulfuric acid, and is split into its components by stronger acids.

In testimony whereof I hereunto affix my signature in the presence of two witnesses.

DR. ROBERT WERNER.

Witnesses:
 HERMANN TAEGER,
 JOSEPH PEIFFER.